United States Patent [19]

Schomaker et al.

[11] Patent Number: 5,738,791
[45] Date of Patent: Apr. 14, 1998

[54] EXTRACTION OF METAL IONS FROM AN AQUEOUS SOLUTION

[75] Inventors: Elwin Schomaker, NX Velp; Abele Broer van der Meer, EH Renkum; Johannes Bos, BG Westervoort; Erik Leonard Middelhoek, GH Arnhem, all of Netherlands

[73] Assignee: Akzo Nobel NV, Arnhem, Netherlands

[21] Appl. No.: 714,870

[22] Filed: Sep. 17, 1996

Related U.S. Application Data

[63] Continuation of Ser. No. 369,198, Jan. 5, 1995, abandoned.

[30] Foreign Application Priority Data

Jan. 6, 1994 [NL] Netherlands .................. 9400013

[51] Int. Cl.$^6$ .................. B01D 11/02; B01D 11/04
[52] U.S. Cl. .................. 210/638; 210/502.1; 210/684; 210/688
[58] Field of Search .................. 210/263, 502.1, 210/511, 634, 638, 639, 684, 688, 912; 423/100, 139, 157, 181; 521/25, 28, 30; 524/414, 417; 502/401, 402; 264/41, 49

[56] References Cited

U.S. PATENT DOCUMENTS

| 3,960,762 | 6/1976 | Kroebel et al. | 252/426 |
|---|---|---|---|
| 4,247,498 | 1/1981 | Castro | 264/41 |
| 4,437,994 | 3/1984 | Baker | 210/638 |
| 4,500,494 | 2/1985 | Scher | 423/24 |
| 4,622,344 | 11/1986 | Babcock et al. | 521/28 |
| 4,702,838 | 10/1987 | Babcock et al. | 210/688 |
| 5,015,448 | 5/1991 | Vorlop et al. | 423/24 |
| 5,279,745 | 1/1994 | Jeffers et al. | 210/688 |

FOREIGN PATENT DOCUMENTS

| 7217118 | 6/1973 | Netherlands . |
| 1407257 | 9/1975 | United Kingdom . |
| 2115425 | 9/1983 | United Kingdom . |
| 2172293 | 9/1986 | United Kingdom . |
| WO91/05859 | 2/1991 | WIPO . |

*Primary Examiner*—Joseph W. Drodge
*Attorney, Agent, or Firm*—Richard P. Fennelly; Louis A. Morris

[57] ABSTRACT

A method for the making and use of a porous, preferably dimensionally stable, hydrophobic polymer for the extraction of metal ions from an aqueous solution, with the polymer being in the form of a regenerative granulate or powder having an average particle diameter of from 0.1 to 10 mm and pores of from 0.1 to 50 μm, which is obtained by the dissolving of a polymer, with heating, at a temperature above the upper critical demixing temperature Tc in a complexing agent containing hydrophobic liquid, followed by lowering of the temperature, resulting in a porous polymer filled with the hydrophobic liquid, and the mechanical diminution of the solidified mass is disclosed. Favorable results have been attained using polypropylene as the hydrophobic polymer, bis(2,4,4-trimethylpentyl)thio acid as the complexing agent, and with a mixture of dibenzyl toluene and/or polypropylene glycol ether being part of the hydrophobic liquid.

15 Claims, No Drawings

EXTRACTION OF METAL IONS FROM AN AQUEOUS SOLUTION

This is a continuation of application Ser. No. 08/369,198 filed Jan. 5, 1995 now abandoned.

CROSS REFERENCE TO RELATED APPLICATIONS

This application claims the benefit of the filing date of prior Netherlands Patent Application Serial Number 9,400,013, filed Jan. 6, 1994, entitled "Material For The Extraction of Metal Ions From An Aqueous Solution", which is incorporated herein by reference in its entirety.

BACKGROUND OF THE INVENTION

1. Field of the Invention

The present invention relates to the use of a porous, preferably dimensionally stable, hydrophobic polymer for the extraction of metal ions from an aqueous solution, the polymer having pores of from 0.1 to 50 μm in which there is immobilized an organic complexing agent having hydrophobic properties which optionally is incorporated into a hydrophobic liquid.

2. Description of the Related Art

The use of a porous polymer for the extraction of metal ions was earlier described in U.S. Pat. No. 4,437,994. The disclosed porous polymer is in the form of hollow fibers, the walls of which are a microporous membrane having its pores filled with an organic liquid comprising a complexing agent, and the ions travel through the walls to be liberated in an aqueous product solution circulated over the outside of the fibers.

A major drawback to the use of these known materials is that their preparation is laborious and hence expensive. Prior to extrusion the melted polymer used for making melt spun fibers has been mixed with finely divided material, which is removed after forming of the fiber in the spinneret by dissolving such in an appropriate solvent in a template leaching process to impart porosity to the wall of the finished fibers. Such a process is complicated and expensive and does not lead to fibers having an anisotropic nature, which is a prerequisite for high capacity, non-leaking fibers. Therefore, preference is given to a solution spinning process using a tube-in-orifice spinneret system to obtain fibers possessing an anisotropic structure, with, in effect, skins about the outside of the fiber and binds the lumen within the fiber which have pores of relatively small size, and with the wall of the fiber between these inner and outer skins having distributed therein pores of considerably greater size. In the patent examples, exclusive use is made of polysulphone microporous fibers, the preparation of which calls for the use of water compatible solvents, such as dimethyl formamide ("DMF"), dimethyl sulphoxide, tetrahydrofuran, and acetone, which may prove harmful to the environment to a greater or lesser extent. After their preparation, the microporous walls of the hollow fibers are impregnated with organic liquid by circulating the organic liquid through the lumens of the fibers for several minutes, during which time the liquid is absorbed by capillary action. Such a filling operation is cumbersome and therefore expensive. A further drawback of using such known materials is the risk of fouling.

In WO 91/05859 use is made of a porous material with an organic complexing agent immobilized therein for the extraction of metal ions. The porous matrix is composed of polysulphone or cellulose acetate, which are comparatively hydrophilic. Porosity is attained by dissolving the polymer in an organic solvent, adding the complexing agent thereto, and injecting the thus obtained solution into a water bath. Further, a certain amount of activated carbon is added to immobilize the complexing agent in the porous polymer. The low rate of exchange mentioned in several of the examples is not encouraging where commercial scale use of this material is concerned.

GB-A-1 407 257 discloses a process for the preparation of ion-exchange materials in which organic ion-exchange reagents are incorporated into a vinyl monomer suspension polymerization charge which is then polymerized to entrap the organic ion-exchange reagents in the bulk of an organic polymeric support. The process is, however, not susceptible of universal application to all organic ion-exchange reagents; moreover, the materials are found to have rather slow extraction kinetics and also suffer from the gradual diffusion of the organic ion-exchange reagent from the material.

GB-A-2 172 293 discloses the use of solid, immobilized extractants, produced by absorbing (a) a liquid extractant which is not homopoly-merisable onto (b) a porous, solid, particulate, substrate; adsorbing (c) a monomer onto the substrate; and polymerizing the adsorbed monomer (c) thereby entrapping the liquid extractant (a) on substrate (b). Such extractants have been found to have still insufficient capacity and extraction kinetics.

SUMMARY OF THE INVENTION

In accordance with one aspect of the present invention, there is provided a method for extracting metal ions from an aqueous solution, including contacting the aqueous solution with a porous polymer having an average particle diameter of from 0.1 to 10 mm and pores of from 0.1 to 50 μm in which there is immobilized an organic complexing agent having hydrophobic properties.

In accordance with another aspect of the present invention, there is provided a method for making a porous, preferably dimensionally stable, hydrophobic polymer for the extraction of metal ions from an aqueous solution, including dissolving a polymer, with heating, at a temperature above the upper critical demixing temperature Tc, in a hydrophobic complexing liquid containing an organic complexing agent having hydrophobic properties, followed by lowering of the temperature, resulting in a porous polymer filled with the hydrophobic liquid, and the mechanical diminution of the solidified mass to provide granulate or powder of a porous polymer having an average particle diameter of from 0.1 to 10 mm and pores of from 0.1 to 50 μm in which there is immobilized the organic complexing agent having hydrophobic properties.

These and other objects of the present invention will become apparent upon a review of the following detailed description and the claims appended thereto.

DETAILED DESCRIPTION OF PREFERRED EMBODIMENTS

The present invention provides a method for the use of a porous polymer having a hydrophobic organic complexing agent contained therein which, a significant increase in the capacity per volume unit notwithstanding, does not give rise to stability problems, not even when utilized on an industrial scale. The commercial scale preparation of the porous polymer can be effected easily, inexpensively, and in an environment-friendly manner. Metals can be bonded with the polymer and regenerated over a very short period of time.

The method of the present invention uses a regenerative granulate or powder of a porous polymer having an average particle diameter of from 0.1 to 10 mm and pores of from 0.1 to 50 μm, which is obtained by the dissolving of a polymer, with heating, at a temperature above the upper critical demixing temperature ("Tc") in the hydrophobic complexing liquid, followed by lowering of the temperature, resulting in a porous polymer filled with the hydrophobic liquid, and the mechanical diminution of the solidified mass.

The present invention provides a method for extracting metal ions from an aqueous solution, including contacting the aqueous solution with a porous polymer having an average particle diameter of from 0.1 to 10 mm and pores of from 0.1 to 50 μm in which there is immobilized an organic complexing agent having hydrophobic properties. The organic complexing agent having hydrophobic properties is optionally incorporated into a hydrophobic liquid.

The present invention further provides a method for making a porous, preferably dimensionally stable, hydrophobic polymer for the extraction of metal ions from an aqueous solution, including dissolving a polymer having pores of from 0.01 to 10 μm, with heating, at a temperature above the upper critical demixing temperature Tc, in a hydrophobic complexing liquid containing an organic complexing agent having hydrophobic properties, followed by lowering of the temperature, resulting in a porous polymer filled with the hydrophobic liquid, and the mechanical diminution of the solidified mass to provide granulate or powder of a porous polymer having an average particle diameter of from 0.1 to 10 mm and pores of from 0.1 to 50 μm in which there is immobilized the organic complexing agent having hydrophobic properties.

The average pore diameter can be determined with advantage using mercury porosimetry in accordance with ASTM D 4284-83.

It is regarded as extremely surprising that the use of a porous material having both a hydrophobic surface area and an average pore diameter in the indicated range provides a system which can be regenerated and is so effective as to now render commercial scale use possible.

It was found that, in general, most preferable results can be obtained when using a material having an average pore diameter in the range of from 0.2 to 15 μm.

While the hydrophobic complexing agent may be incorporated into the pores of the hydrophobic polymer as such, preference is given to a material where the complexing agent is incorporated into a hydrophobic liquid. According to the present invention, the organic complexing agent is readily soluble in the hydrophobic liquid, which, of course, will be virtually insoluble in the aqueous solution to be extracted and so immobilized in the porous matrix as to be incapable of flowing out. It has been found that most preferable immobilization is ensured when use is made of material having an average pore diameter of from 0.2 to 15 μm.

According to the present invention, preference is given to an absorption material in which both the complexing agent and any hydrophobic liquid present are non-volatile and have high thermal, hydrolytic, oxidative, and chemical stability. The glycerol esters of one or more, preferably unsaturated fatty acids may be indicated as examples of a hydrophobic liquid suitable to be used according to the present invention.

Under certain conditions regeneration with an acid may cause the aforementioned oils to hydrolyse. To prevent this problem, the invention provides a porous material incorporating as hydrophobic liquid a non-hydrolyzable high boiling solvent, which has preferably a boiling point of at least 200° C. Good results have been obtained with the use of a porous polymer filled with an aromatic solvent, such as dibenzyl toluene, which is commercialized by Hüls under the trade designation Marlotherm-S, tetratoluene, which is an experimental product ex Hüls, oligomers of styrene, and co-oligomers of styrene and α-olefins. Good results have also been obtained with the use of a porous polymer filled with a high boiling aliphatic solvent, such as paraffin oil. Mixtures of aromatic and aliphatic solvents are also suitable. Within this framework favorable results have likewise been obtained via incorporation into the hydrophobic liquid of polypropylene glycol ether having a molecular weight in the range of from 600 to 1500, most preferable results being obtained using a polypropylene glycol ether having a molecular weight of about 1000.

A porous polymer suitable for use in the present invention can be obtained by a process disclosed in U.S. Pat. No. 4,247,498, which is incorporated herein by reference in its entirety.

Examples of polymers suitable for practicing the present invention are: low density polyethylene, high density polyethylene, polypropylene, polystyrene, acrylonitrile-butadiene-styrene terpolymers, styreneacrylonitrile copolymers, styrene-butadiene copolymers, poly(4-methylpentene-1), and polybutene.

Most preferable results were obtained by using polymers based on polyolefins, with preference being given to the use of a polypropylene based porous material.

Generally, the porous polymer is employed in the form of a granulate or a powder having an average particle diameter of from 0.1 to 10 mm and may be used in a packed bed, a fluidized bed, or a tank with stirring.

It has been found that with the material according to the present invention the extraction of metal ions is possible at a concentration of less than 1 wt. % of complexing agent, calculated on the combined amount of complexing agent and hydrophobic liquid. In actual practice, preference is given to a material where the amount of complexing agent incorporated into the hydrophobic liquid is at least 5 wt. %, most preferable results were attained using an amount of complexing agent in the hydrophobic liquid in the range of 10 to 50 wt. %. However, higher concentrations of complexing agent of up to 100 wt. % also give favorable results.

The organic complexing agents suitable for use in the materials according to the present invention belong to several classes of compounds. Favorable results have been obtained using organic phosphorus compounds, certain oxime compounds, and certain organic carboxylic acids. Organic phosphorus compounds are particularly suitable for removing copper, nickel, cobalt, cadmium, uranium, the transurania, iron and/or zinc from aqueous waste streams, and the oxime compounds were found to be especially suitable for removing copper. Exemplifying an organic carboxylic acid pre-eminently suitable for complexing zinc is a highly branched $C_9$–$C_{11}$ alkyl carboxylic acid commercialized by Shell under the trade designation "Versatic acid."

The organic phosphorus compounds are advantageously selected from the group of organic phosphates, phosphoric acids, acids, phosphonic acids, thiophosphates, thiophosphoric acids, dithiophosphoric acids, thiophosphonic acids, dithiophosphonic acids, thio acids, and dithio acids. Preference is given in this case to the use of one or more compounds from the group of di(2-ethylhexyl) phosphoric acid, bis(2,4,4-trimethylpentyl) phosphonic acid, bis(2,4,4-trimethylpentyl) thio acid, and bis(2,4,4-trimethylpentyl) dithio acid.

According to the present invention, the preferred oxime compounds generally belong to the group of hydroxyoxime compounds. Examples of this type of complexing agent include 2-hydroxy-5-alkyl benzaldehyde oxime, 2-hydroxyalkyl benzophenone oxime, 2,6-diformyl-4-alkyl phenol oxime, or 5,8-diethyl-7-hydroxy-dodecan-6-one oxime.

Generally, the procedure used to prepare the extracting material according to the present invention is described in U.S. Pat. No. 4,247,498, which is incorporated herein by reference in its entirety. However, the preferred preparative process is a variation on one described in GB-A-2 115 425, which is incorporated herein by reference in its entirety, which proceeds as follows: first, from 5 to 90 wt. % of a polymer is dissolved, with heating, at a temperature beyond the critical demixing temperature Tc, in from 10 to 95 wt. % of one or, where necessary, more liquid and miscible compounds A and/or B and/or C, the selected A/B/C mixing ratio being such as will give phase separation on cooling, resulting in a polymer-rich and a polymer-poor phase. On further lowering of the temperature, the phase separation structure will be fixed prior to the completion of phase separation due to the polymer vitrifying or crystallizing, resulting in a porous polymer material filled with one or more of compounds A and/or B and/or C and pre-eminently suited to be used according to the present invention, either as such or after a reduction if so desired. Usually, compound C is added when compounds A and/or B display such a high affinity for the polymer as will result in there not being any liquid/liquid phase separation on cooling prior to vitrification or crystallization.

Favorable results have been attained using polypropylene as matrix polymer and bis(2,4,4-trimethylpentyl)thio acid as complexing agent, while the hydrophobic liquid is a mixture of dibenzyl toluene and polypropylene glycol ether having a molecular weight in the range of from 600 to 1500.

Needless to say, the materials according to the present invention are suitable not just for removing heavy metals, such as Fe, Cu, Cd and/or Zn, from aqueous waste streams; another option is to employ them in the extraction of valuable metals, such as Au, Ag, and Pt, or radioactive materials, such as uranium, from usually highly dilute aqueous solutions.

The invention will be further illustrated with reference to the following specific examples. It is understood that these examples are given by way of illustration and are not meant to limit the disclosure or the claims to follow.

EXAMPLE I

Use was made of a porous polymer obtained by heating a mixture of 30 parts by weight of polypropylene, 19.3 parts by weight of bis(2,4,4-trimethylpentyl)thio acid (Cyanex 302, ex Cyanamid), 32.9 parts by weight of soybean oil, and 17.8 parts by weight of castor oil to 250° C. until a homogeneous mass was obtained, followed by cooling to form a porous polypropylene filled with a mixture of complexing agent, soybean oil, and castor oil. After grinding, a porous powder was obtained which satisfied the following specification:

| | |
|---|---|
| Particle diameter | 350–1000 μm |
| Average pore diameter | 6 μm |
| Degree of substitution with oil and Cyanex 302 | 70 wt. % |

In each of the following experiments a column (length 93 mm, diameter 8.3 mm) in the form of a packed bed was filled with approximately 2 g of absorption material having the aforementioned specification. In all cases this column was loaded with Zn-containing waste water of the following composition:

| | |
|---|---|
| Na | 1260 ppm |
| Ca | 15 ppm |
| Fe | 1 ppm |
| Mg | 9 ppm |
| Zn | 18 ppm |

Four experiments were performed in which the pH of the water to be purified was varied by adding a particular amount of 1N NaOH. The rate of flow in all cases was 1 ml/minute. A Zn-concentration in the effluent of >0.1 ppm was taken as the breakthrough point.

TABLE I

| Experiment No. | pH | Amount of Zn absorbed (in mg) (on reaching the breakthrough point) |
|---|---|---|
| 1 | 2.5 | 0.4 |
| 2 | 3.3 | 3.8 and 0.2 mg Fe |
| 3 | 3.4 | 4.7 and 0.25 mg Fe |

The material loaded in the above experiment no. 3 was regenerated with 21 ml of 30% $H_2SO_4$ at a rate of flow of the liquid of 0.1 ml/minute. After regeneration it was found that only 0.06 mg of Zn remained in the column. No elements apart from Zn and Fe were absorbed in significant quantities.

EXAMPLE II

In a manner analogous to that disclosed in Example I, porous polymers filled with extraction material were prepared by heating a mixture of 30 parts by weight of polypropylene, 30 parts by weight of Cyanex 302, 30 parts by weight of dibenzyl toluene (Marlotherm S, ex Hüls), and 10 parts by weight of polypropylene glycol having a molecular weight of 1000 to a temperature of 250° C. until a homogeneous mass was obtained, followed by cooling to form a porous polypropylene filled with a mixture of complexing agent, dibenzyl toluene, and polypropylene glycol. After grinding, a porous powder was obtained with an average pore diameter of 5 μm.

A column (length 90 mm, diameter 8.4 mm) in the form of a packed bed was filled with 2.2 g of the above absorption material. The column was loaded with an aqueous solution of zinc sulphate (20 mg Zn/l) at a flow rate of 1 ml/minute. A Zn-concentration in the effluent of >0.1 ppm was taken as the breakthrough point. The result as a function of the pH is given in Table II.

TABLE II

| Experiment No. | pH | Amount of Zn absorbed (in mg) (on reaching the breakthrough point) | |
|---|---|---|---|
| | | Per g Cyanex | Per g column material |
| 4 | 1.8 | 1.0 | 0.3 |
| 5 | 2.00 | 3.5 | 1.1 |
| 6 | 2.33 | 13.5 | 4.1 |
| 7 | 2.80 | 30.6 | 9.2 |
| 8 | 3.20 | 46.6 | 14.0 |
| 9 | 3.30 | 55.7 | 16.7 |
| 10 | 3.50 | 52.5 | 15.8 |

EXAMPLE III

In a manner analogous to that disclosed in Example II, porous polymers filled with extraction material were prepared by heating a mixture of 30 parts by weight of polypropylene, 50 parts by weight of Cyanex 302, and 20 parts by weight of polypropylene glycol having a molecular weight of 1000 to a temperature of 250° C. until a homogeneous mass was obtained, followed by cooling to form a porous polypropylene filled with a mixture of complexing agent and polypropylene glycol. After grinding, a porous powder was obtained with an average pore diameter of 10 µm.

The same column as that in Example II was filled with 2.2 g of the above absorption material. The column was loaded with Zn-containing waste water of the following composition:

|    | mg/l |
|----|------|
| Zn | 20   |
| Fe | 0.7  |
| Ca | 11   |
| Na | 1325 |
| Al | 10   |
| Cl | 110  |

Two experiments were performed with the material of Example III (experiment nos. 11 and 12) and two with the material of Example II (experiments nos. 13 and 14). The pH of the water to be purified was in the range of from 3.52 to 3.57. The rate of flow was about 1 ml/minute or 4 ml/minute. A Zn-concentration in the effluent of >0.1 ppm was taken as the breakthrough point.

TABLE III

| Experiment No. | Flow (ml/min) | pH | Amount of Zn absorbed (in mg) (on reaching the breakthrough point) | |
|---|---|---|---|---|
| | | | Per g Cyanex | Per g Column Material |
| 11 | 0.98 | 3.57 | 42.5 | 21.3 |
| 12 | 4.0 | 3.52 | 33.0 | 16.5 |
| 13 | 0.91 | 3.57 | 49.9 | 15.0 |
| 14 | 4.0 | 3.57 | 33.4 | 10.0 |

EXAMPLE IV

This experiment serves to show that the packed column disclosed in Example II could be loaded and regenerated several times without any substantial loss of activity. The concentration of the Zn-containing water was 280 mg Zn/l, the pH 3.5, and the flow 1 ml/minute during 3 hours. After a breakthrough, the column was rinsed with demi-water, followed by regeneration with 25% $H_2SO_4$ in countercurrent at a flow rate of 0.1 ml/minute. The successive amounts of Zn (in mg Zn/g Cyanex) absorbed by the column were as follows: 63.5, 75.3, 65.6, 65.0, 60.8, 68.9, 70.4, 71.0, 68.7, and 67.4 mg Zn/g Cyanex. The regeneration was for >99% complete after elution with 12 ml $H_2SO_4$.

From the results mentioned above, it appears that there is no loss of activity.

While the invention has been described with preferred embodiments, it is to be understood that variations and modifications are to be considered within the preview and the scope of the claims appended hereto.

What is claimed is:

1. A method for extracting metal ions from an aqueous solution, comprising contacting the aqueous solution with particles of a hydrophobic, isotropic, microporous polymer having an average diameter of from 0.1 to 10 mm and pores having an average diameter of from 0.1 to 50 µm, prepared by heating a mixture of a synthetic thermoplastic polymer selected from the group consisting of low density polyethylene, high density polyethylene, polypropylene, polystyrene, acrylonitrile-butadiene-styrene terpolymers, styrene-acrylonitrile copolymers, styrene-butadiene copolymers, poly(4-methyl-pentene-1), and polybutene, and a compatible hydrophobic organic complexing liquid to a temperature and for a time sufficient to form a homogeneous solution, cooling said solution at a rate and to a temperature sufficient to initiate liquid-liquid phase separation, continuing the cooling to form a solidified mass, and mechanically diminuting the solidified mass in which there is immobilized the organic complexing liquid.

2. The method according to claim 1, wherein the hydrophobic organic complexing liquid comprises a hydrophobic organic complexing agent selected from the group consisting of organic phosphorus compounds, oxime compounds, organic carboxylic acids and mixture thereof.

3. The method according to claim 2, wherein the hydrophobic liquid comprises polypropylene glycol ether having a molecular weight in the range of from 600 to 1500.

4. The method according to claim 2, wherein the hydrophobic liquid comprises at least 5 wt. % of a complexing agent, calculated on the basis of the combined amount of complexing agent and compatible hydrophobic liquid.

5. The method according to claim 2, wherein the hydrophobic liquid incorporates complexing agent in the range of from 10 to 50 wt. %, calculated on the basis of the combined amount of complexing agent and compatible hydrophobic liquid.

6. The method according to claim 2, wherein the complexing agent comprises organic phosphorus compounds selected from the group consisting of organic phosphates, phosphoric acids, phosphonic acids, thiophosphates, thiophosphoric acids, dithiophosphoric acids, thiophosphonic acids, dithiophosphonic acids, thiophosphinic acids, dithiophosphinic acids and mixtures thereof.

7. The method according to claim 2, wherein the complexing agent comprises organic phosphorus compounds selected from the group consisting of di(2-ethylhexyl) phosphoric acid, bis(2,4,4-trimethylpentyl) acid, bis(2,4,4-trimethylpentyl) thiophosphinic acid, bis(2,4,4-trimethylpentyl) dithiophosphinic acid and mixtures thereof.

8. The method according to claim 2, wherein the complexing agent comprises hydroxyoxime selected from the group consisting of 2-hydroxy-5-alkyl benzaldehyde oxime, 2-hydroxyalkyl benzophenone oxime, 2,6-diformyl-4-alkyl phenol oxime, 5,8-diethyl-7-hydroxy-dodecan-6-one oxime and mixture thereof.

9. The method according to claim 1, wherein the average diameter of the microporous polymer pores is from 0.2 to 15 µm.

10. The method according to claim 1, wherein the organic complexing agent is incorporated into a hydrophobic liquid which contains a non-hydrolyzable, high boiling solvent.

11. The method according to claim 10, wherein the high boiling solvent has a boiling point of at least 200° C.

12. The method according to claim 10, wherein the high boiling solvent is an aromatic solvent.

13. The method according to claim 10, wherein the high boiling solvent is an aliphatic solvent.

14. The method according to claim 1, wherein the polymer is polypropylene, the complexing liquid comprises bis(2,4,4-trimethylpentyl)-thio acid, and the hydrophobic liquid comprises a mixture of dibenzyl toluene and polypropylene glycol ether having a molecular weight in the range of from 600 to 1500.

15. The polymer product prepared according to the process of claim 1.

* * * * *